US008806495B2

(12) United States Patent
Larus et al.

(10) Patent No.: US 8,806,495 B2
(45) Date of Patent: Aug. 12, 2014

(54) LIGHTWEIGHT TRANSACTIONAL MEMORY FOR DATA PARALLEL PROGRAMMING

(75) Inventors: James R. Larus, Mercer Island, WA (US); Timothy Lawrence Harris, Cambridge (GB); Virendra Jayant Marathe, Rochester, NY (US)

(73) Assignee: Microsoft Corp., Redmond, WA (US)

( * ) Notice: Subject to any disclaimer, the term of this patent is extended or adjusted under 35 U.S.C. 154(b) by 1653 days.

(21) Appl. No.: 11/824,311

(22) Filed: Jun. 29, 2007

(65) Prior Publication Data

US 2008/0120455 A1    May 22, 2008

Related U.S. Application Data

(60) Provisional application No. 60/860,153, filed on Nov. 20, 2006.

(51) Int. Cl.
    *G06F 9/46*    (2006.01)

(52) U.S. Cl.
    USPC ........................... 718/101; 718/100; 718/102

(58) Field of Classification Search
    USPC .................................................. 718/100, 101
    See application file for complete search history.

(56) References Cited

U.S. PATENT DOCUMENTS

| 5,353,418 | A | * | 10/1994 | Nikhil et al. ................. 718/108 |
| 5,428,761 | A | | 6/1995 | Herlihy et al. |
| 5,687,372 | A | * | 11/1997 | Hotea et al. .................. 718/105 |
| 5,835,763 | A | * | 11/1998 | Klein ............................ 718/101 |
| 5,857,180 | A | | 1/1999 | Hallmark et al. |
| 6,104,869 | A | * | 8/2000 | Minoya et al. ................ 709/204 |
| 6,330,591 | B1 | | 12/2001 | Ducaroir et al. |
| 6,880,045 | B2 | * | 4/2005 | Pong et al. .................... 711/135 |
| 6,950,843 | B2 | | 9/2005 | Nakanishi |
| 6,978,396 | B2 | | 12/2005 | Ruuth et al. |
| 7,054,987 | B1 | * | 5/2006 | Reed et al. .................... 710/310 |
| 7,085,866 | B1 | | 8/2006 | Hobson et al. |
| 7,395,382 | B1 | * | 7/2008 | Moir ............................. 711/147 |
| 7,900,207 | B2 | * | 3/2011 | Nemirovsky et al. ......... 718/107 |
| 2004/0015642 | A1 | * | 1/2004 | Moir et al. ........................ 711/1 |
| 2004/0210904 | A1 | * | 10/2004 | Jones et al. .................... 718/107 |
| 2005/0071320 | A1 | * | 3/2005 | Chkodrov et al. ................. 707/3 |
| 2005/0144192 | A1 | * | 6/2005 | Chkodrov et al. ............ 707/102 |
| 2005/0193286 | A1 | * | 9/2005 | Thatte et al. .................... 714/48 |

(Continued)

OTHER PUBLICATIONS

Hammond, et al., "Transactional Memory Coherence and Consistency", pp. 1-12, Jun. 21, 2004.
Moore, et al., "LogTM: Log-based Transactional Memory", Date: Feb. 11-15, 2006, pp. 1-12.
Shriraman, et al., "Hardware Acceleration of Software Transactional Memory", Date: Dec. 2005, pp. 1-22.

*Primary Examiner* — Charles Swift
(74) *Attorney, Agent, or Firm* — Dan Choi; Carole Boelitz; Micky Minhas

(57) ABSTRACT

Described is a technology by which alternative use for transactional memory is provided, namely implementing atomic work items that are run asynchronously from their creation in a thread. Described are mechanisms by which threads control the work items that they have created. Atomic work items are scheduled on worker threads managed by the language's runtime system. Atomic work items can use retry to express condition synchronization, providing a general mechanism for controlling when and in what order they are executed. Work items may be grouped, with coordination managed among the grouped work items. Also described by way of example is a highly-parallel implementation of a Chaff satisfiability solver, comprising an example of an important group of applications, including theorem provers and constraint optimization systems.

16 Claims, 5 Drawing Sheets

(56) References Cited

U.S. PATENT DOCUMENTS

| | | | |
|---|---|---|---|
| 2006/0085588 A1* | 4/2006 | Rajwar et al. | 711/100 |
| 2006/0085591 A1* | 4/2006 | Kumar et al. | 711/113 |
| 2006/0173885 A1* | 8/2006 | Moir et al. | 707/101 |
| 2006/0206534 A1* | 9/2006 | Banks et al. | 707/200 |
| 2006/0218557 A1* | 9/2006 | Garthwaite et al. | 718/105 |
| 2007/0073693 A1* | 3/2007 | Harris et al. | 707/8 |

\* cited by examiner

LIGHTWEIGHT TRANSACTIONAL MEMORY FOR DATA PARALLEL PROGRAMMING

CROSS-REFERENCE TO RELATED APPLICATION

The present application claims priority to U.S. provisional patent application Ser. No. 60/860,153, entitled "Lightweight Transactional Memory for Data Parallel Programming," filed Nov. 20, 2006, assigned to the assignee of the present application, and hereby incorporated by reference.

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Transactional memory (TM) is a relatively new parallel programming abstraction that will likely be useful in writing programs for a new generation of Multicore and Manycore parallel computers. Transactional memory provides a programmer with a non-imperative way to provide isolation and atomicity for concurrently executing threads that share data. In published papers and current systems, transactional memory is closely tied to a thread. A thread starts a transaction, which protects its code against memory references from code running on other threads.

This approach is valuable, since many programs are written with a small number of concurrent threads. However, there are other approaches to writing parallel programs that would also benefit from the isolation and atomicity offered by transactional memory. For example, data parallelism is an alternative parallel programming abstraction in which an operation is applied to each element in a collection of data. Typically the operation must be capable of running independently in parallel when applied to each element. For example, the application of the operation to different elements must not interfere with one another, other than through specially supported abstractions like reductions. Thus, problems with high degrees of data parallelism and complex interactions between operations are difficult to parallelize efficiently with transactional memory or with existing data parallelism abstractions.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which work items corresponding to transactions are multiplexed and/or run asynchronously in a thread, and in which the thread executes the work items, including via a retry mechanism by which at least one work item may indicate that it is not yet ready to run by invoking a 'retry' mechanism. In this manner, there is implemented a combination of data parallelism and transactional memory, e.g., application of a transactional operation to elements in a collection and a mechanism for combining and/or reducing the results of these applications. Also provided is the concept of "featherweight" transaction implementation, e.g., decoupling of a transaction from a thread's stack through an aspect in which a transaction that runs to completion does not require a stack if the transaction is invoked from a known point in a program.

In one aspect, work items may be grouped into a group, in which each work item is associated with a transaction and a set of data that the transaction is required to process. A mechanism coordinates the execution of the work items, e.g., including by waiting for the grouped work items to reach a quiescent state, suspending the grouped work items, and/or propagating an exception to other work items when one of the work items throws an exception.

In one aspect, objects to which a plurality of work items perform transactions are each associated with a wait list of each work item waiting to perform a transaction on the object. Each transaction includes a read log that includes the object. When a transaction produces a retry, the work item of that transaction is enqueued into the object's wait list. A writer worker that updates the object dequeues any work items in the object's wait list, and schedules those work items for execution.

In one aspect, a sequence reduce method applies a transactional function to each element of a sequence. The results of the transactional function are combined and/or reduced when the outcome of the transaction function corresponds to a commit.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
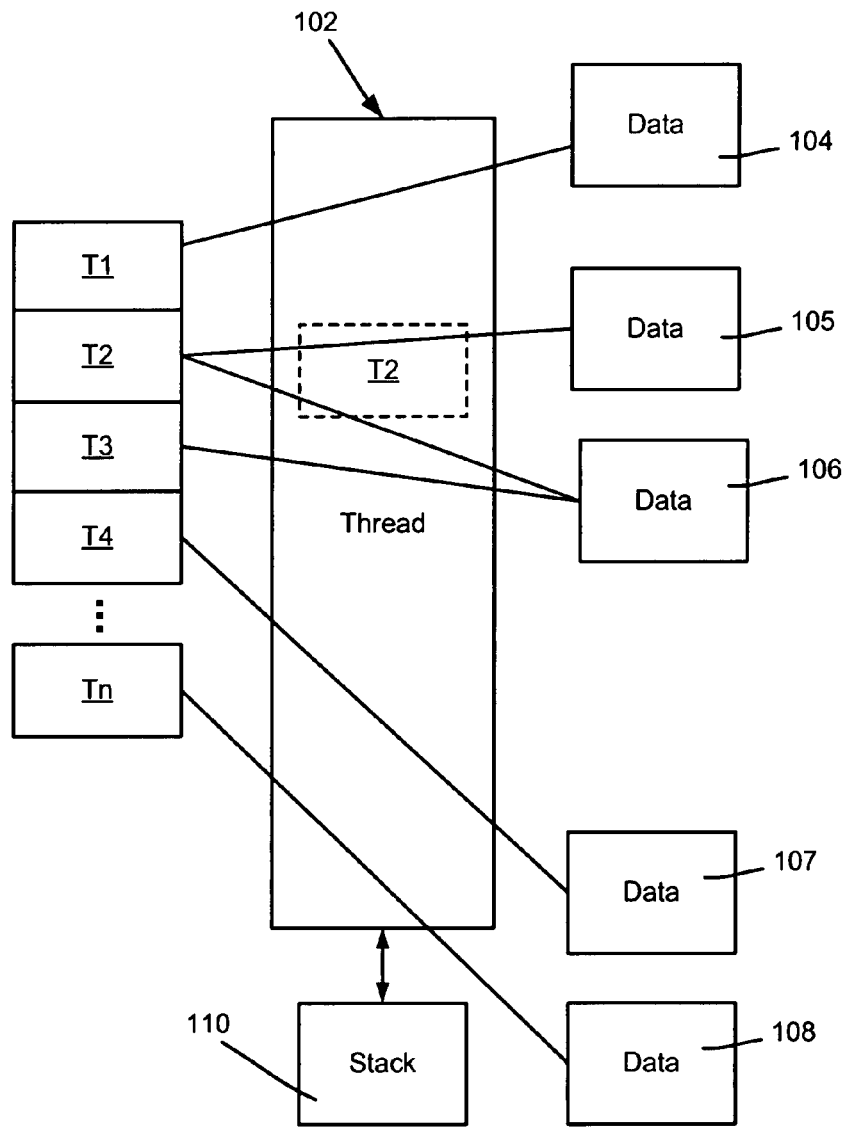
FIG. 1 is an example block diagram representing a plurality of transactions associated with a thread.

Various aspects of the technology described herein are generally directed towards a technology that implements a combination of data parallelism and transactional memory, e.g., application of a transactional operation to a collection and a mechanism for combining and/or reducing the results of these applications. Also provided is the concept of "featherweight" transaction implementation, e.g., decoupling of a transaction from a thread's stack through an aspect in which a transaction that runs to completion does not require a stack if the transaction is invoked from a known point in a program.

While the technology is described with various examples, it is understood that these are only examples of possible implementations. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Transactional memory is typically used to implement atomic blocks, such as sections of code which appear to run atomically with respect to the actions of other threads. However, atomic blocks are only suited for styles of parallel programming in which threads are manually created to identify possible parallel activities, and in which the activities they perform are sufficiently large to amortize the costs of thread creation.

Described herein is an alternative use for transactional memory, generally directed towards implementing atomic work items that are run asynchronously from their creation in a thread. This abstraction, along with the mechanisms by which threads control the work items that they have created, are described in more detail below.

By way of example, atomic work items are scheduled on worker threads managed by the language's runtime system. These abstractions occupy a useful middle ground between traditional atomic blocks with manually controlled threading, and traditional data parallelism in which the work items can run independently but without isolation (e.g. a parallel-map operation across the items in an array). Further described herein are concepts directed towards gaining more than just having each work item run in a separate memory transaction, including that atomic work items can use retry to express condition synchronization, providing a general mechanism for controlling when and in what order they are executed and a mechanism for combining results of the work items.

A retry language construct introduced by Harris et al., (T. Harris, S. Marlow, S. Peyton-Jones, and M. Herlihy, *Composable Memory Transactions*, In Proceedings of the 10th ACM SIGPLAN Symposium on Principles and Practice of Parallel Programming, pages 48-60, 2005; also see United States Patent Application Publication No. 20070073693 entitled "Transaction and task scheduler"), provides a basis for condition synchronization based coordination among concurrent threads. Among insights set forth herein is that inactive (committed or aborted) transactions do not need to be associated with a runtime stack. As per the Harris et al. retry semantics, a transaction blocked by 'retry' is aborted for all practical purposes and hence does not require a stack.

To illustrate this, one example (set forth below) implemented a highly-parallel implementation of the Chaff satisfiability solver, (as described in the reference, M. W. Moskewicz, C. F. Madigan, Y. Zhao, L. Zhang, and S. Malik, *Chaff: Engineering an Efficient SAT Solver*, In Proceedings on the 38th Design and Automation Conference, pages 530-535, 2001). This is an example of an important group of applications, including theorem provers (e.g. Zap), and constraint optimization systems (e.g. Disolver). How a parallel version of Chaff using was built using new techniques described herein is exemplified below. These applications naturally exhibit large degrees of data-level parallelism in which potentially millions of fine-grain transactions may co-exist.

However, while investigating Chaff, it was noted that existing abstractions are not enough to simplify parallelization of some applications. In these applications, concurrent transactions can interact with each other in non-trivial ways, whereas a main programming concept as described herein is to properly coordinate such interactions.

To eliminate stack frames of the method body encapsulating a transaction, one aspect restricts the programming model such that the enclosing method contains only the transaction's body. As represented in FIG. 1, transactions T1-Tn are thus able to be multiplexed onto a thread 102, provided each transaction is guaranteed to run to completion on the thread. By completion it is meant that the transaction either commits or aborts.

Figure 2:
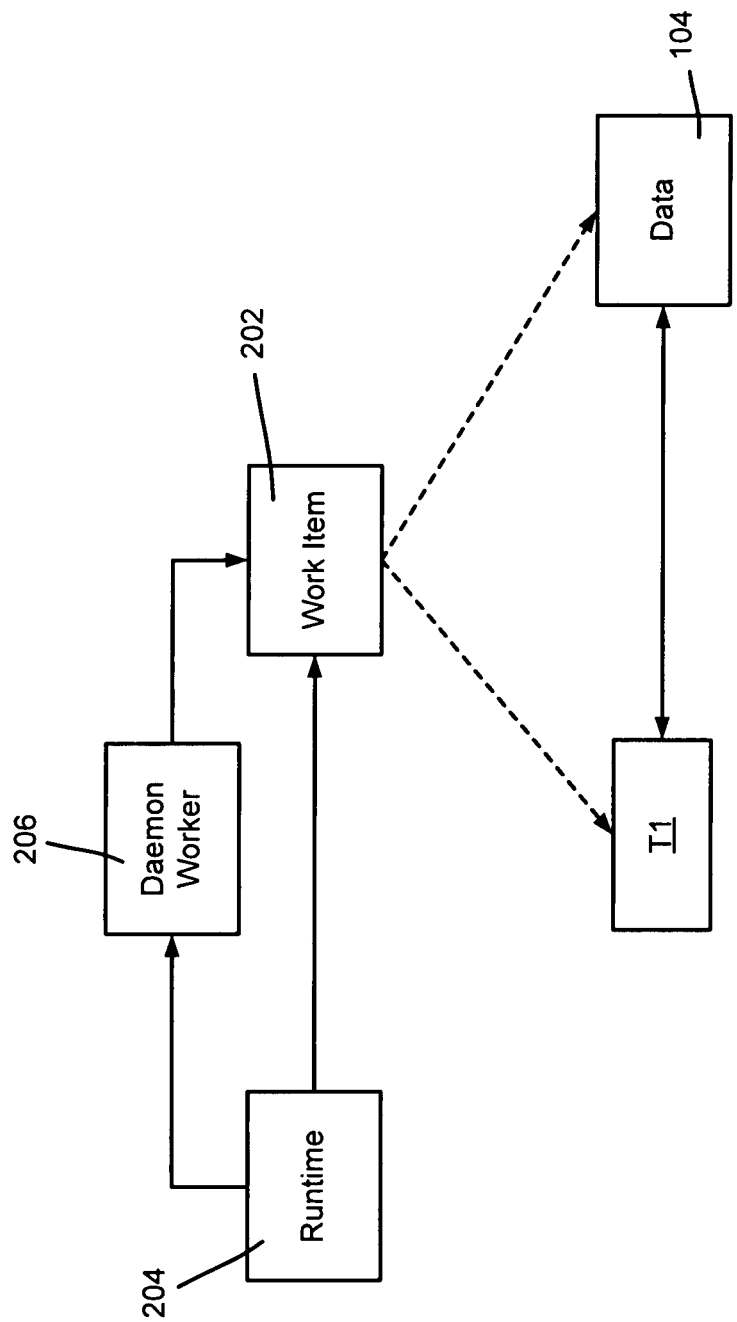
FIG. 2 is a block diagram representing example relationships, including between a work item, a transaction and data processed by the transaction.

A transaction is a unit of atomically done work on one or more globally shared data structures 104-108. In data parallel applications, transactions typically would be associated with certain data they process. As represented in FIG. 2, there is defined a new abstraction called an atomic work item 202 (henceforth called "work item") that associates a transaction (e.g., T1) with a particular data item (e.g., 104) that the transaction is required to process. In one example implementation, a work item is an instance of class WorkItem, and is instantiated by passing a function delegate (an abstraction for type-safe function pointers) and the data as the WorkItem's constructor parameters. The work item's data object 104 is essentially the sole parameter to its delegate function. To execute that work item 202, the runtime system 204 calls the delegate function of the work item 202, passing its data object as the parameter.

In addition to atomic work items, there is herein introduced the concept of daemon workers that repeat execution of work items after they commit (a work item is re-executed if it aborts due to data conflicts or blocking via retry). As also represented in FIG. 2, there is shown a general block diagram in which a unique daemon worker 206 is associated with each work item, e.g., work item 202. In one example implementation, a daemon is an instance of class TxnWorker. A programmer suspends a daemon using a special TxnWorker.Suspend( ) method call. This disallows subsequent execution of the suspended daemon's work items.

Figure 3:
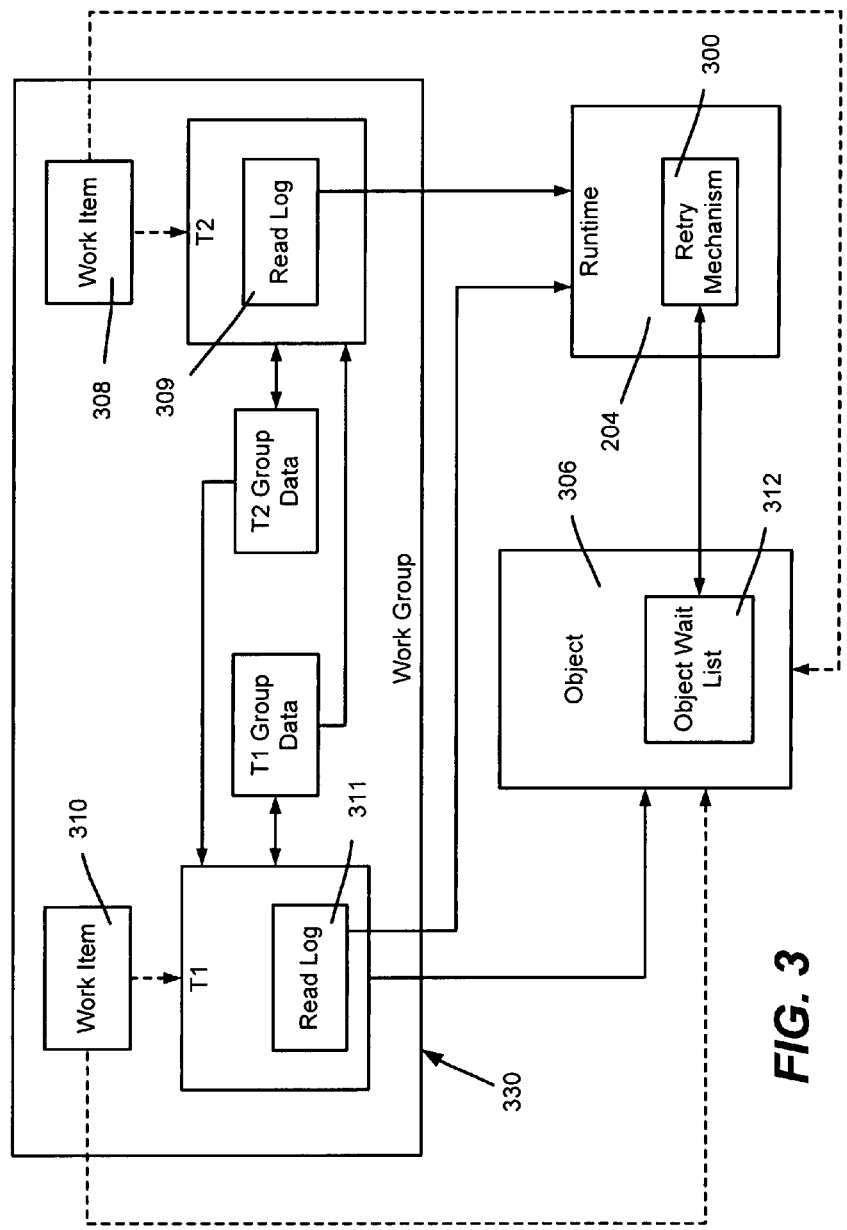
FIG. 3 is a block diagram representing example aspects related to transactions grouped into a work group.

Apart from referring to individual work items, a programmer may need to perform operations on groups of work items, such as starting execution of all work items in a group, waiting for all members of a group reach a quiescent state, suspending all work items in a specific group, performing group level joins and splits, and so forth. Another abstraction, represented in FIG. 3 and referred to as a work group 330, is provided for these purposes, and thus may provide for far richer semantics.

While programming applications that modify system state via work groups, a significant operation is to makes a coordinator thread wait for a group 220 to reach a quiescent state. In one example implementation, this is implemented as the TxnGrp.WaitForAll( ) method, which facilitates coordination of work items in a group 330. Note that each transaction has associated group data, which can include state information about that transaction.

Another problem considers the semantics of exception handling in work items. In some earlier work, exceptions reaching boundaries of atomic blocks abort the work done within the block, and are re-thrown to the enclosing context. In the context of atomic work items, an exception is considered generated by a work item to be an exception generated by the group to which it belongs. Thus, when a work item throws an exception, the entire group's activity is suspended and the exception is percolated to the thread that waits for the group to reach a quiescent state. Note that multiple work items may simultaneously generate exceptions in a group; in one implementation, all but one exception is suppressed. Further note that it may be valuable to permit dispatch of multiple exceptions from a work group.

There are several other operations on these abstractions that are useful for the underlying runtime system as well as for user programmers. Abstractions may be implemented in the Bartok STM system, as described in the reference: T. Harris, M. Plesko, A. Shinnar, and D. Tarditi, *Optimizing Memory Transactions*, In Proceedings of the ACM SIGPLAN Conference on Programming Language Design and Implementation, 2006.

Figure 4:
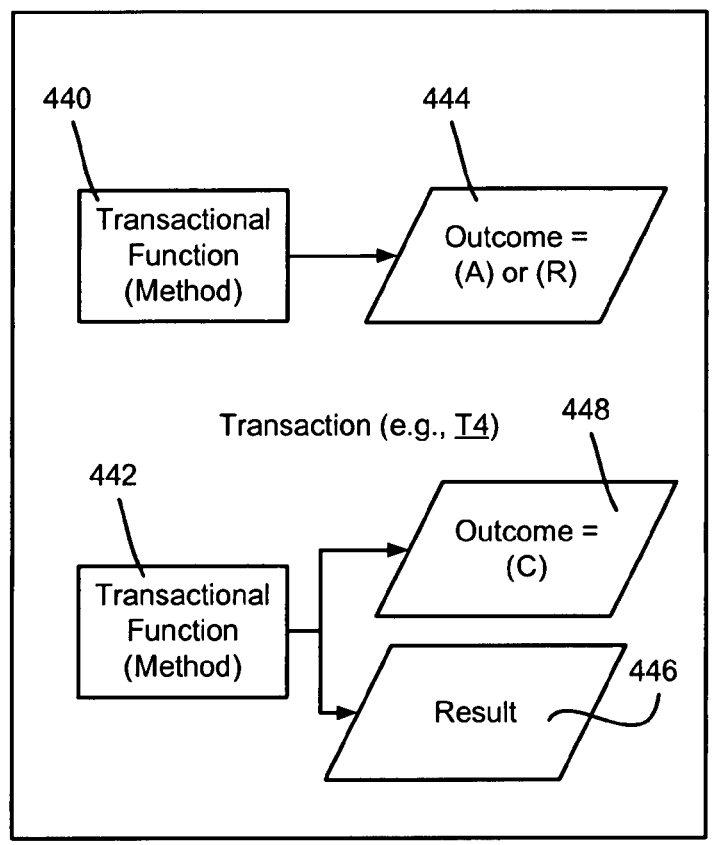
FIG. 4 is a representation of example transactional functions that produce an abort, retry or commit outcome, and further produce a result when the outcome is commit.

As represented in FIG. 4, a transactional function (e.g., 440 or 442) is a method whose body executes in an atomic block and which has two results, namely the function's result and the function's outcome, which is one of Commit (C), Abort (A), or Retry (R). For simplicity, it can be assumed that a method only produces a result when it commits. Thus, in FIG. 4, the transactional function 440 does not produce a result, because its outcome 444 is (A) or (R), while the transactional function 442 does produce a result 446 because its outcome 448 is (C).

Figure 5:
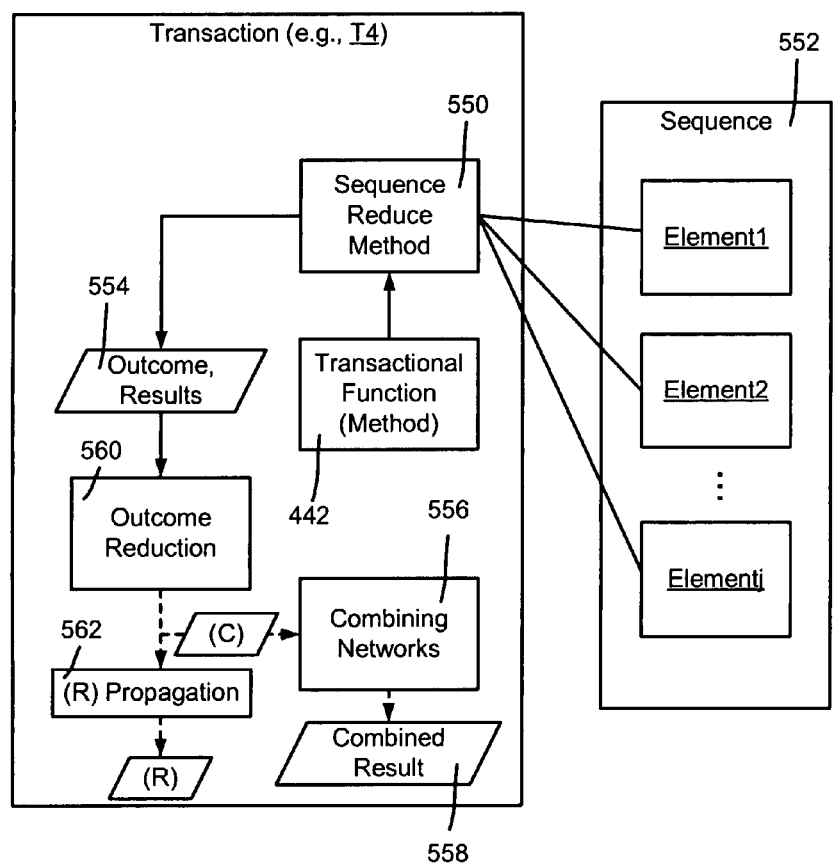
FIG. 5 is a representation of transaction methods and components that process a sequence of elements to produce a reduced and/or combined result.

As represented in FIG. 5, Sequence.Reduce(transFunc, combineValueFunc, combineControlFunc) comprises a method 550 that applies a transactional function (e.g., transFunc 444) to each element (element1-elementj) of a sequence 552. The transFunc can return void if the transaction modifies global state. The results 554 from each function application are reduced (e.g., pairwise) by combining networks 556. (It is feasible to have one combining network that could handle both values, but for simplicity it is easier to explain with two networks.)

Using a function (combineValueFunc) pairwise reduces the results from committed transactions and produces a result 558 from reducing the sequence. Another function 560, combineControlFunc, pairwise reduces the outcome (C, A, or R) of transactions and produces a result (C, A, or R) for the sequence reduction as a whole. In one example, this second reduction is a simple function that returns C, so that transactions that abort or retry are ignored.

Another function 562 propagates (R) retry 560, so that the sequence reduction re-executes if any transaction re-executes. This sets forth the semantics that may be used to implement the SAT solver. Efficiency is likely not an issue, since a transactional function executes to termination (C, A, or R), and thus does not require a thread to be permanently associated with a transaction.

The following describes example code added to one example compiler (e.g., Bartok) system to support a "txngrps" abstraction. In particular, the relevant code is added to the "txngrps" branch of the example compiler, and contains support for the work group abstraction that is used to introduce large scale fine-grain parallelism in applications. The abstractions leverage support for the "retry" language constructs used for conditional waiting in memory transactions. Consequently, this code also contains support for the retry construct (not on syntactic level, but by using existing in-built exception handling infrastructure support).

In one implementation, atomic blocks are supported in the example compiler via the built-in exception handling infrastructure.

The example compiler interprets such a try ... catch block to be an atomic block, and attaches calls to StartAtomic( ) at the beginning of the block, and Validate( ) and CommitAtomic( ) at the end of the block. In a Validate( ) call and other calls that update the transaction's metadata while it accesses different shared objects, a special AtomicException is thrown if the transaction is found to have a conflict with another concurrent transaction.

Retry is supported in a similar fashion. An example atomic block with retry support looks from the perspective of a user programmer appears as set forth below:

```
try {
  try {
  } catch(RetryAtomicException) {
  }
} catch(AtomicFakeException) {
}
```

The blocks are nested for convenience of implementation and to maintain compatibility with existing atomic blocks-related exception infrastructure. The two exceptions types may be integrated.

Code for retry support is split into two components, namely code to link the try-catch blocks properly, and code for the runtime that dictates the behavior of transactions at runtime.

One implementation of retry 300 is coupled with implementation of worker tasks (work items) in a transaction group (txngrp) 330. At any time, it is expected that a transaction (that may retry in its lifetime) always executes on behalf of a worker task. Returning to FIG. 3, each object 306 that is waited-on by a worker task (e.g., work item 308) contains a special "waitlist" 310 of workers. Whenever a transaction (e.g., T1 corresponding to work item 310) does a retry (by throwing a RetryAtomicException object), the runtime 204 traverses the transaction's readset (read log 311), and for each object listed in the readset, enqueues its current worker task 310 in that object's waitlist 312. The object's MultiUseWord needs to be in inflated state for this to happen. A writer worker that updates an object on which a group of readers have retried notifies those readers that they can continue execution. In one implementation, the writer dequeues any waiters of the object from the object's waitlist 312 and subsequently schedules them for execution.

Turning to the Chaff example, there are four primary methods involved in the transactionalization process of Chaff, namely preprocess_TxnGrp( ), real_solve_TxnGrp( ), make_decision_TxnGrp( ), and set_svar_value_TxnGrp( ). The preprocess_TxnGrp( ) method starts execution of the txngrp. The real_solve_TxnGrp( ) method contains code for the main thread that issues explicit literal assignments, waits for workers to finish a Boolean constraint propagation (BCP) cycle, and processes conflict clauses. The make_decision_TxnGrp( ) method is indirectly called by the real_solve_TxnGrp( ) to transactionally make a literal assignment. The set_svar_value_TxnGrp( ) method contains the code for workers, and is responsible for performing the BCP operations.

With respect to parallelizing Zchaff, because the satisfyability problem (SAT) is NP-complete, there exists no known way of implementing the fastest SAT solver. All existing solvers rely on different heuristics to make literal assignment decisions. However, most, if not all, SAT solvers rely on the standard Boolean constraint propagation (BCP) algorithm to propagate implied literal assignments once an explicit literal assignment (suggested by the decision heuristic) is made. It is also widely known that BCP is the most time consuming (roughly about eight percent of the execution time of a solver) operation in any SAT solver. This BCP component of ZChaff in may be focused on for purposes of parallelization.

One example implementation of ZChaff, set forth herein, processes formulas in the 3CNF SAT form. In the sequential version, whenever an explicit literal assignment is made (say l) it is posted in a global implication queue. The BCP algorithm thereafter gets the implication queue's first literal entry and looks up the clauses containing the negation of that literal (¬1 in this example). Since 1 is assigned the value true its negation, ¬1 is false. ZChaff then determines if any clause containing ¬1 contains a single unassigned literal and all other literals have the value false. If so, the unassigned literal is implied to be true and is in turn posted in the implication queue. After processing all clauses corresponding to ¬1, the algorithm checks if a new implication queue entry was added and processes it in a similar fashion.

A coarse-grain method of parallelizing ZChaff is to fork off two threads at a point where an explicit literal assignment is made; one thread takes the literal and the other takes its negation. In existing implementations, this approach has led to performance improvements that vary widely based on the input formula. An alternate fine-grain parallelization approach focuses on the BCP component of SAT solvers wherein "computational units" are dedicated to process distinct sets of clauses in the SAT formula. An explicit literal assignment triggers activity in these computational units that collectively perform the BCP task.

Fine-grain parallelization has a definite advantage provided the concurrency achieved is sufficient to offset the coordination cost involved. To achieve high concurrency a computational unit needs to be fine-grained. However, that may lead to an unmanagably large number of threads (computational units) in the system. Additionally, the task of writing such an application even with the atomic block abstraction is quite difficult because of the difficulty in explicitly controlling coordination among these computational units. The above-described atomic work item abstractions significantly mitigate these complications.

Using an abstraction as described herein, parallelizing ZChaff is straightforward, namely directed towards dedicating an atomic work item for each clause in the formula. Let each work item execute by reading variables in its clause. If there exists a literal assignment that may lead to an implied literal assignment, make that literal assignment and commit. It there is no such literal assignment then retry. A main coordinator thread manages explicit literal assignments in the formula. After making the literal assignment, the main thread waits for completion of BCP activity by making a call to WaitForAll( ) on the work group.

If a clause evaluates to false due to a literal assignment, an exception is raised by the corresponding work item, which in turn suspends execution of the entire work group. The WaitForAll( ) method called by the main thread returns this exception. On receiving an exception, the main thread generates a conflict clause and adds it to the existing list of clauses. Note that conflict clauses are considered to be valuable in that they help in pruning large search spaces in SAT solvers.

The claimed invention described herein is operational within numerous types of general purpose or special purpose computing devices. Such computing devices can be typically found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc. The device should have a sufficient computational capability and system memory to enable basic computational operations. In particular, the computational capability can include one or more processing unit(s), and may also include one or more GPUs, either or both in communication with system memory. Note that that the processing unit(s) of the general computing device of may be specialized microprocessors, such as a DSP, a VLIW, or other micro-controller, or can be conventional CPUs having one or more processing cores, including specialized GPU-based cores in a multi-core CPU.

In addition, the computing device may also include other components, such as, for example, a communications interface. The computing device may also include one or more conventional computer input devices (e.g., pointing devices, keyboards, audio input devices, video input devices, haptic input devices, devices for receiving wired or wireless data transmissions, etc.). The computing device may also include other optional components, such as, for example, one or more conventional computer output devices (e.g., display device(s), audio output devices, video output devices, devices for transmitting wired or wireless data transmissions, etc.). Note that typical communications interfaces, input devices, output devices, and storage devices for general-purpose computers are well known to those skilled in the art, and will not be described in detail herein.

The computing device may also include a variety of computer readable media. Computer readable media can be any available media that can be accessed by computer via storage devices and includes both volatile and nonvolatile media that is either removable and/or non-removable, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Further, software, programs, and/or computer program products embodying the some or all of the various embodiments of the claimed invention described herein, or portions thereof, may be stored, received, transmitted, or read from any desired combination of computer or machine readable media or storage devices and communication media in the form of computer executable instructions or other data structures.

Finally, the claimed invention described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented process, comprising using a computing device for performing the following action,
   multiplexing a plurality of transactions corresponding to a plurality of atomic work items that work on globally shared data items and run asynchronously on a thread, each work item being associated with a transaction, a particular data item that a transaction is required to process and a different daemon worker,
   wherein there are at least two different daemon workers for processing the globally shared data items, and
   wherein each transaction runs to completion on the thread, and
   wherein at least one work item may indicate that it is not yet ready to run by invoking a retry construct such that a transaction that does not commit can be terminated and can be retried via a retry mechanism using the daemon worker associated with the atomic work item so that the atomic work item can control when and in what order the atomic work item is executed on the thread.

2. The computer-implemented process of claim 1 comprising, multiplexing a plurality of transactions onto a thread, and executing the thread and another thread in parallel.

3. The computer-implemented process of claim 1 further comprising, applying the threads to parallelize a satisfiability solver application.

4. In a computing environment, a system comprising,
   a general purpose computing device;
   a computer program comprising program modules executable by the general purpose computing device, comprising:
   a plurality of different daemon workers;
   a plurality of atomic work items in a group that work on globally shared data items, each work item being associated with a transaction, a set of data which that transaction is required to process and a daemon worker associated with each work item that repeats execution of the work item if the work item aborts or blocks via retry, and
   a mechanism that coordinates the execution of the work items,
     wherein the mechanism that coordinates the execution of the work items waits for the work items in a group to reach a quiescent state; and
     wherein the mechanism comprises a retry mechanism by which at least one work item may indicate that it is not yet ready to run by invoking the retry mechanism using the associated daemon worker to control when and in what order the work item is executed.

5. The system of claim 4 wherein the mechanism that coordinates the execution of the work items suspends the work items.

6. The system of claim 4 wherein the mechanism that coordinates the execution of the work items propagates an exception to other work items when one of the work items throws an exception.

7. The system of claim 4 wherein the work item includes a transaction, and wherein the transaction is associated with read set data that determines when to re-execute the transaction.

8. The system of claim 4 further comprising an object to which a plurality of work items perform transactions, the object associated with a wait list of each work item waiting to perform a transaction on the object.

9. The system of claim 8 wherein in a daemon worker further comprises a writer worker that updates the object, including dequeuing any work items in the object wait list, and scheduling those work items for execution.

10. The system of claim 4 further comprising a sequence reduce method that applies a transactional function to each element of a sequence.

11. The system of claim 10 further comprising means for combining results of the transactional function when the outcome of the transaction function corresponds to a commit.

12. In a computing environment, a system comprising,
    a general purpose computing device;
    a computer program comprising program modules executable by the general purpose computing device, comprising:
    a plurality of different daemon workers;
    work items that work on globally shared data items and that run asynchronously in a thread, wherein each work item is associated with a transaction, a particular data item that a transaction is required to process, and a daemon worker for that work item that repeats execution of the work item if the work item aborts or blocks via retry, including at least one mechanism by which the thread controls the work items, including a retry mechanism which determines when at least one work item may be re-executed and re-executes the work item as determined.

13. The system of claim 12 wherein the work items are grouped to operate in controlled operations on a collection of data items.

14. The system of claim 13 further comprising a mechanism for combining or reducing results of the operations on the collection of data items, or both combining and reducing results of the operations on the collection of data items.

15. The system of claim 13 wherein the mechanism by which the thread controls the work items waits for grouped work items to reach a quiescent state, suspends the grouped work items or propagates an exception to the grouped work items, or any combination thereof.

16. The system of claim 12 further comprising an object to which a plurality of work items perform operations, the object associated with a wait list of each work item waiting to perform a transaction on the object, and wherein the mechanism by which the thread controls the work items enqueues transactions associated with the work item and object into the object's wait list when a transaction produces a retry with respect to operating on that object.

* * * * *